(12) United States Patent  
Takasawa

(10) Patent No.: US 10,313,595 B2  
(45) Date of Patent: Jun. 4, 2019

(54) IMAGE PICKUP APPARATUS THAT DISPLAYS ASPECT MARKERS, AND STORAGE MEDIUM

(71) Applicant: CANON KABUSHIKI KAISHA, Tokyo (JP)

(72) Inventor: Kengo Takasawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/796,899

(22) Filed: Oct. 30, 2017

(65) Prior Publication Data

US 2018/0124324 A1     May 3, 2018

(30) Foreign Application Priority Data

Nov. 2, 2016    (JP) ................................ 2016-215403

(51) Int. Cl.
| | |
|---|---|
| *H04N 5/232* | (2006.01) |
| *H04N 5/225* | (2006.01) |
| *G02B 13/08* | (2006.01) |
| *G02B 7/02* | (2006.01) |
| *H04N 5/262* | (2006.01) |

(52) U.S. Cl.
CPC .......... *H04N 5/23293* (2013.01); *G02B 7/02* (2013.01); *G02B 13/08* (2013.01); *H04N 5/2254* (2013.01); *H04N 5/23209* (2013.01); *H04N 5/23216* (2013.01); *H04N 5/2628* (2013.01)

(58) Field of Classification Search
None
See application file for complete search history.

(56) References Cited

U.S. PATENT DOCUMENTS

| | | | | |
|---|---|---|---|---|
| 5,502,486 | A * | 3/1996 | Ueda ....................... | H04N 5/272 348/239 |
| 9,451,169 | B2 * | 9/2016 | Ohashi ............... | H04N 5/23222 |
| 2002/0140711 | A1* | 10/2002 | Saito ........................ | G09G 5/20 345/660 |
| 2004/0257458 | A1* | 12/2004 | Huang ............... | H04N 5/23293 348/333.01 |

(Continued)

FOREIGN PATENT DOCUMENTS

| | | |
|---|---|---|
| JP | H03153173 A | 7/1991 |
| JP | H1070675 A | 3/1998 |

*Primary Examiner* — Twyler L Haskins
*Assistant Examiner* — Wesley J Chiu
(74) *Attorney, Agent, or Firm* — Rossi, Kimms & McDowell LLP

(57) ABSTRACT

An image pickup apparatus that prevents erroneous recognition of a photographing range when a video acquired using an anamorphic lens is displayed. A system controller determines a type of a lens mounted on a lens mounting section. When the type of the mounted lens is a first lens for scaling a video by a factor of 1/a in a horizontal direction, first aspect markers indicating an aspect ratio of M:N are displayed in a state superimposed on a first video acquired via the first lens. When the type of the mounted lens is a second lens for scaling the video by a factor of 1/b in the horizontal direction, second aspect markers indicating an aspect ratio of M':N (M'=M×a/b) are displayed in a state superimposed on a second video acquired via the second lens.

15 Claims, 9 Drawing Sheets

(56) References Cited

U.S. PATENT DOCUMENTS

| | | | |
|---|---|---|---|
| 2005/0166249 A1* | 7/2005 | Kettle | H04N 7/0122 |
| | | | 725/116 |
| 2010/0097488 A1* | 4/2010 | Suzuki | G09G 5/00 |
| | | | 348/222.1 |
| 2010/0149378 A1* | 6/2010 | Suzuki | H04N 5/232 |
| | | | 348/231.99 |
| 2011/0050972 A1* | 3/2011 | Ishitsuka | H04N 5/23293 |
| | | | 348/333.01 |
| 2018/0063445 A1* | 3/2018 | Ogaki | H04N 5/2228 |

* cited by examiner

— ASPECT MARKER

— ASPECT MARKER

— ASPECT MARKER

— ASPECT MARKER   ---- SAFETY ZONE MARKER

— ASPECT MARKER ------- GRID LINE

— ASPECT MARKER ---- SAFETY ZONE MARKER

— ASPECT MARKER ········ GRID LINE

IMAGE PICKUP APPARATUS THAT DISPLAYS ASPECT MARKERS, AND STORAGE MEDIUM

BACKGROUND OF THE INVENTION

Field of the Invention

The present invention relates to an image pickup apparatus that displays aspect markers, and a storage medium, and more particularly to an image pickup apparatus that performs photographing and reproduction display of a video using an anamorphic optical system and displays aspect markers, and a storage medium.

Description of the Related Art

Conventionally, a method has been proposed which uses an anamorphic optical system having different refractive powers between a horizontal direction and a vertical direction to reduce a video image having a wide angle of view, in the horizontal direction, to thereby photograph a video, and thereafter causes a camera to enlarge the video in the horizontal direction, for output. On the other hand, the sizes indicating photographing ranges of movie images include a cinemascope size which has an aspect ratio of 2.39:1 between the horizontal direction and the vertical direction. This size is used in a large number of video recording and photographing systems.

In the anamorphic optical system, there are used a cylindrical lens which has a refractive power in only one of the horizontal and vertical directions, a toric lens which has different refractive powers between the horizontal direction and the vertical direction, and the like (hereinafter, these lenses are each generically referred to as the "anamorphic lens").

The anamorphic lenses used in the anamorphic optical system include the following two major types. One type is a lens for photographing a video reduced in the horizontal direction by a factor of ½ (hereinafter referred to as the "×2.0 anamorphic lens). The photographed video is output after being enlarged by a factor of 2 in the horizontal direction by the video camera. The other type is a lens for photographing a video reduced in the horizontal direction by a factor of 1/1.3 (hereinafter referred to as the "×1.3 anamorphic lens). The photographed video is output after being enlarged by a factor of 1.3 in the horizontal direction by the video camera. For example, in a case where a video, which is reduced in the horizontal direction by a factor of ½ using the ×2.0 anamorphic lens, is photographed by a 4:3 (1.33:1) sensor, enlargement of the photographed video in the horizontal direction by a factor of 2 for output generates a video having an aspect ratio of 2.66:1. Therefore, in a case where a cinemascope size video having the aspect ratio of 2.39:1 is generated from the output video, the opposite horizontal sides of the output video are trimmed.

Here, there is a case where a photographing range is desired to be confirmed when a video photographed using the ×2.0 anamorphic lens is output as the cinemascope size video having the aspect ratio of 2.39:1. In this case, two methods are available. According to one method, the photographing range is confirmed by displaying the video reduced in the horizontal direction and photographed by the above-mentioned sensor, on a display section, as it is. According to the other method, the photographing range is confirmed by displaying the video photographed by the sensor on the display section after enlarging the same by the video camera in the horizontal direction. Whichever of the two methods may be employed, it is known as a conventional technique to enable a photographer to confirm the photographing range by superimposing aspect markers indicating the cinemascope size on the video displayed on the display section.

Further, Japanese Patent Laid-Open Publication No. H03-153173 and Japanese Patent Laid-Open Publication No. H10-70675 have disclosed a technique of clearly indicating a photographing range when the aspect ratio of a video is changed to a different aspect ratio.

In the above-described conventional technique, however, when the photographing range is confirmed, the same aspect markers are displayed on the display section irrespective of which of the above-described two anamorphic lenses is used to photograph the video, or which of the above-described two methods is employed to confirm the photographing range. Therefore, there is a possibility that the displayed aspect markers cannot recognizably indicate a range within which a cinemascope size video is actually obtained, causing the photographer to err in recognizing the photographing range.

Further, according to Japanese Patent Laid-Open Publication No. H03-153173 and Japanese Patent Laid-Open Publication No. H10-70675, the photographing range is confirmed only by the latter of the above-described two methods, but not by the former of the two methods.

SUMMARY OF THE INVENTION

The present invention provides an image pickup apparatus that prevents erroneous recognition of a photographing range from occurring when a video acquired using an anamorphic lens is displayed on a display section together with aspect markers, and a storage medium.

In a first aspect of the present invention, there is provided an image pickup apparatus comprising a lens mounting section, a determination unit configured to determine a type of a lens mounted on the lens mounting section, and a display control unit configured to perform control such that in a case where it is determined by the determination unit that the type of the lens mounted on the lens mounting section is a first lens for scaling a video by a factor of $1/a$ ($a \geq 1$) in a horizontal direction with respect to a vertical direction, first aspect markers indicating an aspect ratio of M:N are displayed in a state superimposed on a first video acquired via the first lens, whereas in a case where it is determined by the determination unit that the type of the lens mounted on the lens mounting section is a second lens for scaling the video by a factor of $1/b$ ($b \geq 1$, $a \neq b$) in the horizontal direction with respect to the vertical direction, second aspect markers indicating an aspect ratio of M':N ($M' = M \times a/b$) are displayed in a state superimposed on a second video acquired via the second lens.

In a second aspect of the present invention, there is provided an image pickup apparatus comprising a lens mounting section that is capable of having mounted thereon a first lens for reducing a video by a factor of $1/a$ ($a>1$) in a horizontal direction with respect to a vertical direction, a transformation unit configured to generate a first transformed video by enlarging a first video acquired via the first lens by a factor of a in the horizontal direction, a display unit configured to display a video, and a display control unit configured to perform control such that in a case where the first transformed video generated by the transformation unit is displayed, first aspect markers indicating an aspect ratio of m:n are displayed in a state superimposed on the first transformed video, whereas in a case where the first video is displayed, second aspect markers indicating an aspect ratio of m/a:n are displayed in a state superimposed on the first video.

In a third aspect of the present invention, there is provided a non-transitory computer-readable storage medium storing a computer-executable program for executing a display control method for displaying a video acquired by an image pickup apparatus including a lens mounting section via a lens mounted on the lens mounting section, wherein the display control method comprises determining a type of the lens mounted on the lens mounting section, and performing control such that in a case where it is determined that the type of the lens mounted on the lens mounting section is a first lens for scaling a video by a factor of 1/a (a≥1) in a horizontal direction with respect to a vertical direction, first aspect markers indicating an aspect ratio of M:N are displayed in a state superimposed on a first video acquired via the first lens, whereas in a case where it is determined that the type of the lens mounted on the lens mounting section is a second lens for scaling the video by a factor of 1/b (b≥1, a≠b) in the horizontal direction with respect to the vertical direction, second aspect markers indicating an aspect ratio of M':N (M'=M×a/b) are displayed in a state superimposed on a second video acquired via the second lens.

In a fourth aspect of the present invention, there is provided a non-transitory computer-readable storage medium storing a computer-executable program for executing a display control method for displaying a video acquired by an image pickup apparatus on which a first lens for reducing a video by a factor of 1/a (a>1) in a horizontal direction with respect to a vertical direction is mounted, wherein the display control method comprises generating a first transformed video by enlarging a first video acquired by the image pickup apparatus via the first lens by a factor of a in the horizontal direction, and performing control such that in a case where the first transformed video is displayed, first aspect markers indicating an aspect ratio of m:n are displayed in a state superimposed on the first transformed video, whereas in a case where the first video is displayed, second aspect markers indicating an aspect ratio of m/k:n are displayed in a state superimposed on the first video.

According to the present invention, it is possible to prevents erroneous recognition of a photographing range from occurring when a video acquired using an anamorphic lens is displayed on a display section together with aspect markers.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
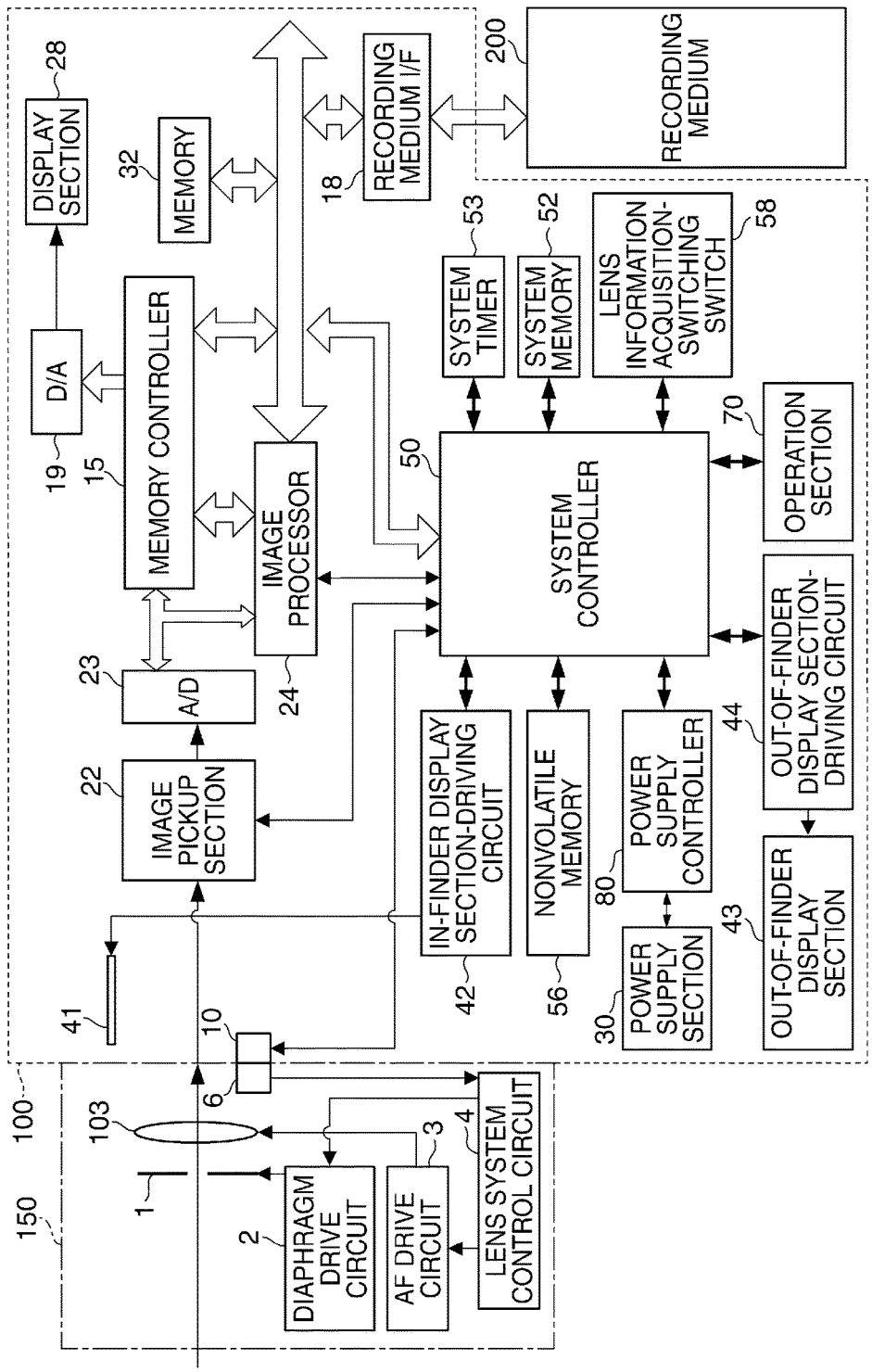
FIG. 1 is a block diagram of a video camera as an image pickup apparatus according to the present invention.

FIG. 1 is a block diagram of a video camera 100 as an image pickup apparatus according to an embodiment of the present invention.

Referring to FIG. 1, a lens unit 150 is a lens mounting section on which one of a plurality of types of lenses is interchangeably mounted as a lens 103.

Although normally, the lens 103 is formed by a plurality of lenses, the illustrated example shows only one lens for simplification. A communication terminal 6 of the lens unit 150 and a communication terminal 10 of the video camera 100 are connected to each other for communication between the video camera 100 and the lens unit 150. The lens unit 150 communicates with a system controller 50 via the communication terminals 6 and 10, and a lens system control circuit 4 in the lens unit 150 controls the overall operation of the lens unit 150 based on the communication. With this control, the control of a diaphragm 1 is performed via a diaphragm drive circuit 2, and focusing is performed by changing the position of the lens 103 via an AF drive circuit 3.

An image pickup section 22 is an image pickup sensor which is implemented e.g. by a CCD (Charged Coupled Device) or a CMOS (Complementary Metal Oxide Semiconductor) device for converting an optical image to image data as electric signals, and has an aspect ratio of 4:3. An analog-to-digital converter 23 is used for converting image data as analog signals output from the image pickup section 22 to image data as digital signals.

An image processor 24 performs resizing (deformation), such as predetermined pixel interpolation and reduction, and color conversion, on the image data output from the analog-to-digital converter 23, or image data output from a memory controller 15, to thereby resize the image data to a cinemascope size having an aspect ratio of 2.39:1 as a photographing range. Further, the image processor 24 performs predetermined calculation processing using the image data obtained through pickup, and the system controller 50 performs exposure control and ranging control based on calculation results obtained by the predetermined calculation processing. With this, AF (Autofocus) processing by the TTL (Through The Lens) method, AE (Automatic Exposure) processing, and EF (Electronic Flash pre-emission) processing are performed. Further, the image processor 24 performs predetermined calculation processing using the image data obtained through image pickup, and also performs AWB (Auto White Balance) processing by the TTL method based on calculation results obtained by the predetermined calculation processing. The image processing section 24 may be implemented by a dedicated circuit, or by a general processor which reads out an image processing program from a nonvolatile memory 56 to realize the above-described processing operations based on the program read out.

The image data output from the analog-to-digital converter 23 is written into a memory 32 via the image processor 24 and the memory controller 15, or directly via the memory controller 15. The memory 32 stores the image data formed by the analog-to-digital converter 23 which converts analog signals obtained by the image pickup section 22 to digital signals, and image data for display on a display section 28. The memory 32 has a sufficient storage capacity to store a predetermined number of still images, and amounts of moving image data and voice data for respective predetermined durations of reproduction thereof.

The memory 32 also serves as an image display memory (video memory). A digital-to-analog converter 19 converts the display image data, which has been stored in the memory 32 for display, to analog signals, and supplies the analog signals to the display section 28. Thus, the display image data, which has been written in the memory 32, is displayed on the display section 28 via the digital-to-analog converter 19. The display section 28 performs display on a display device, such as an LCD having a display screen, according to the analog signals output from the digital-to-analog converter 19. The image data as digital signals once converted from analog to digital by the analog-to-digital converter 23 and accumulated in the memory 32 is converted from digital to analog by the digital-to-analog converter 19, and is sequentially transferred to the display section 28 for display, whereby it is possible to cause the display section 28 to function as an electronic viewfinder, thereby making it possible to perform through image display (live view display).

Further, the memory 32 stores information of various aspect markers, safety zone markers, and grids, described hereinafter.

An in-finder display section-driving circuit 42 causes an in-finder liquid crystal display section 41 to display a frame (AF frame) indicative of a ranging point at which AF processing is currently performed, an icon indicative of a setting state of the video camera, and so forth.

An out-of-finder display section-driving circuit 44 cause an out-of-finder display section 43 to display various settings of the video camera, including a shutter speed, an aperture value, and so forth.

The nonvolatile memory 56 is an electrically erasable and recordable memory, and e.g. an EEPROM (Electrically Erasable Programmable ROM) is used as the nonvolatile memory 56. The nonvolatile memory 56 stores constants, programs, etc., used for the operation of the system controller 50. The programs, mentioned here, include a program for executing a video switching process, described hereinafter.

The system controller 50 is a processor, such as a CPU, for controlling the overall operation of the video camera 100. The video switching process, described hereinafter, is realized by executing the program recorded in the above-mentioned nonvolatile memory 56.

A system memory 52 is implemented by a RAM. The constants, variables, and programs read out from the nonvolatile memory 56, etc., used for the operation of the system controller 50 are loaded into the system memory 52. Further, the system controller 50 also performs display control by controlling the memory 32, the digital-to-analog converter 19, the display section 28, and so forth.

A system timer 53 is a time measurement section that measures time periods used for various types of control, and time of a built-in clock.

An operation section 70 has operation members which have functions suitably assigned thereto on a screen-by-screen basis, thereby serving as various function buttons e.g. through selection and operation of respective associated ones of various function icons displayed on the display section 28. Examples of the function buttons include a menu button, a stop button, a return button, an image scroll button, a jump button, a narrow-down button, and an attribute change button. For example, when the menu button is selected for operation, a menu screen on which various settings can be made is displayed on the display section 28. A user can intuitively make various settings, using the menu screen displayed on the display section 28, and a four-direction button or a set button, referred to hereinafter, of the operation section 70.

The operation section 70 thus serves as an input section for receiving operations of the operation members by the user. The operation section 70 includes a main electronic dial, a power switch, a sub electronic dial, a cross key, the set button, an enlargement button, a reduction button, a reproduction button, etc.

A power supply controller 80 is comprised of a battery detection circuit, a DC-to-DC converter, and a switching circuit for switching between blocks to be energized, and detects whether or not a battery is mounted on the video camera 100, a type of the battery, and a remaining charge amount of the battery. Further, the power supply controller 80 controls the DC-to-DC converter based on the detection results and an instruction from the system controller 50 to apply a required voltage to each of sections of the video camera 10 including a recording medium 200, for respective required time periods.

A power supply section 30 is formed by a primary battery, such as an alkaline battery or a lithium battery, or a secondary battery, such as a NiCd battery, a NiMH battery, or a Li battery, an AC adapter, or the like. A recording medium interface 18 provides an interface between the video camera and the recording medium 200, such as a memory card or a hard disk. The recording medium 200 is a memory card or the like for recording photographed images, and is implemented by a semiconductor memory or a magnetic disk.

A lens information acquisition-switching switch 58 is an input section for receiving operations from the user, and has two types of selection values. By using this switch, the user performs communication between the lens unit 150 and the system controller 50, to thereby select one of a selection value indicative of automatic acquisition of lens information and a selection value indicative of manual acquisition of lens information. Note that the automatic acquisition of lens information, mentioned here, means that the system controller 50 automatically acquires lens information indicative of the type of the lens 103 mounted on the lens unit 150 (hereinafter simply referred to as the "mounted lens"). Further, the manual acquisition of lens information, mentioned here, means that the user determines lens information using the operation section 70 without communication between the lens unit 150 and the system controller 50.

Figure 9:
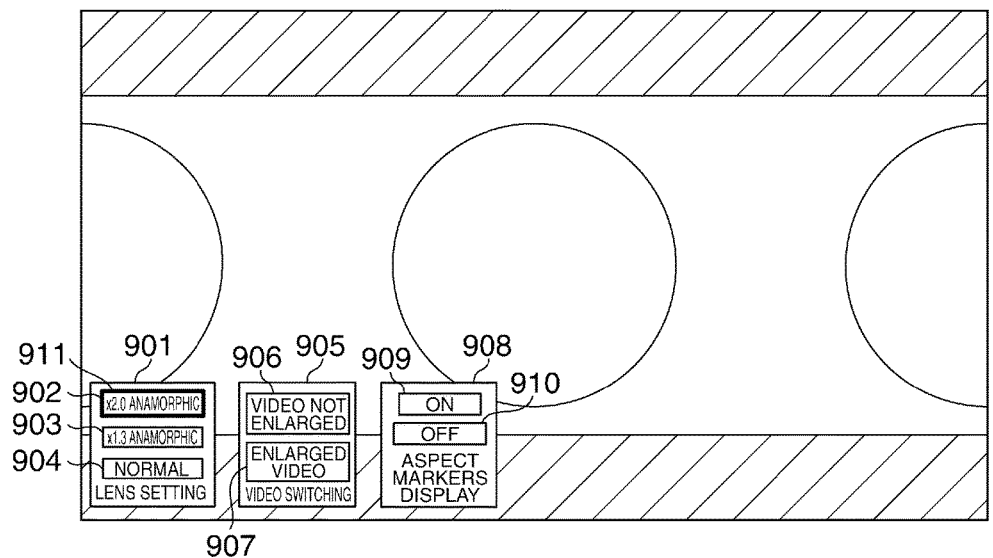
FIG. 9 is a view of a menu screen displayed on the display section.

FIG. 9 is a view of a menu screen displayed on the display section 28 of the video camera 100. As described above, when the user presses the menu button on the operation section 70, the menu screen is displayed on the display section 28.

A lens setting menu 901 is a menu related to settings of the lenses. The user selects one of menu setting values 902 to 904 to thereby determine the type of the mounted lens. More specifically, when the user selects a menu setting value 902, a ×2.0 anamorphic lens is determined as the mounted lens. Similarly, when the user selects a menu setting value 903, a ×1.3 anamorphic lens is determined as the mounted lens. Further, when the user selects a menu setting value 904, a lens that has the same refractive power in a horizontal direction and a vertical direction (hereinafter referred to as the "normal lens") is determined as the mounted lens.

A video switching menu 905 is a menu related to switching between videos. The user selects one of menu setting values 906 and 907. More specifically, when the user selects a menu setting value 906, a method is selected which outputs a video reduced in the horizontal direction using the mounted lens, from the video camera as it is. Further, when the user selects a menu setting value 907, a method is selected which outputs a video reduced in the horizontal direction using the mounted lens after enlarging the video by the video camera in the horizontal direction.

An aspect marker display menu 908 is a menu related to a setting of whether or not to display aspect markers in a state superimposed on a video. This setting is determined according to which of menu setting values 909 and 910 is selected. More specifically, when the user selects a menu setting value 909, the aspect markers are displayed in the state superimposed on the video, whereas when the user selects a menu setting value 910, the aspect markers are not displayed on the video.

A cursor 911 is a thick frame used for selecting one of the above-described menu setting values 902 to 904, 906, 907, 909, and 910 according to a user's operation of the above-mentioned four-direction button (user input). More specifically, according to a user's operation of the left/right button, the cursor 911 selects one of the menus 901, 905, and 908. Further, according to a user's operation of the up/down button, the cursor 911 selects one of menu items included in the selected menu. When the user presses the above-mentioned set button after selecting a menu setting value that the user desires to set, the system controller 50 updates information of the menu setting values registered in the nonvolatile memory 56, using the selected menu setting values.

Figure 2A:
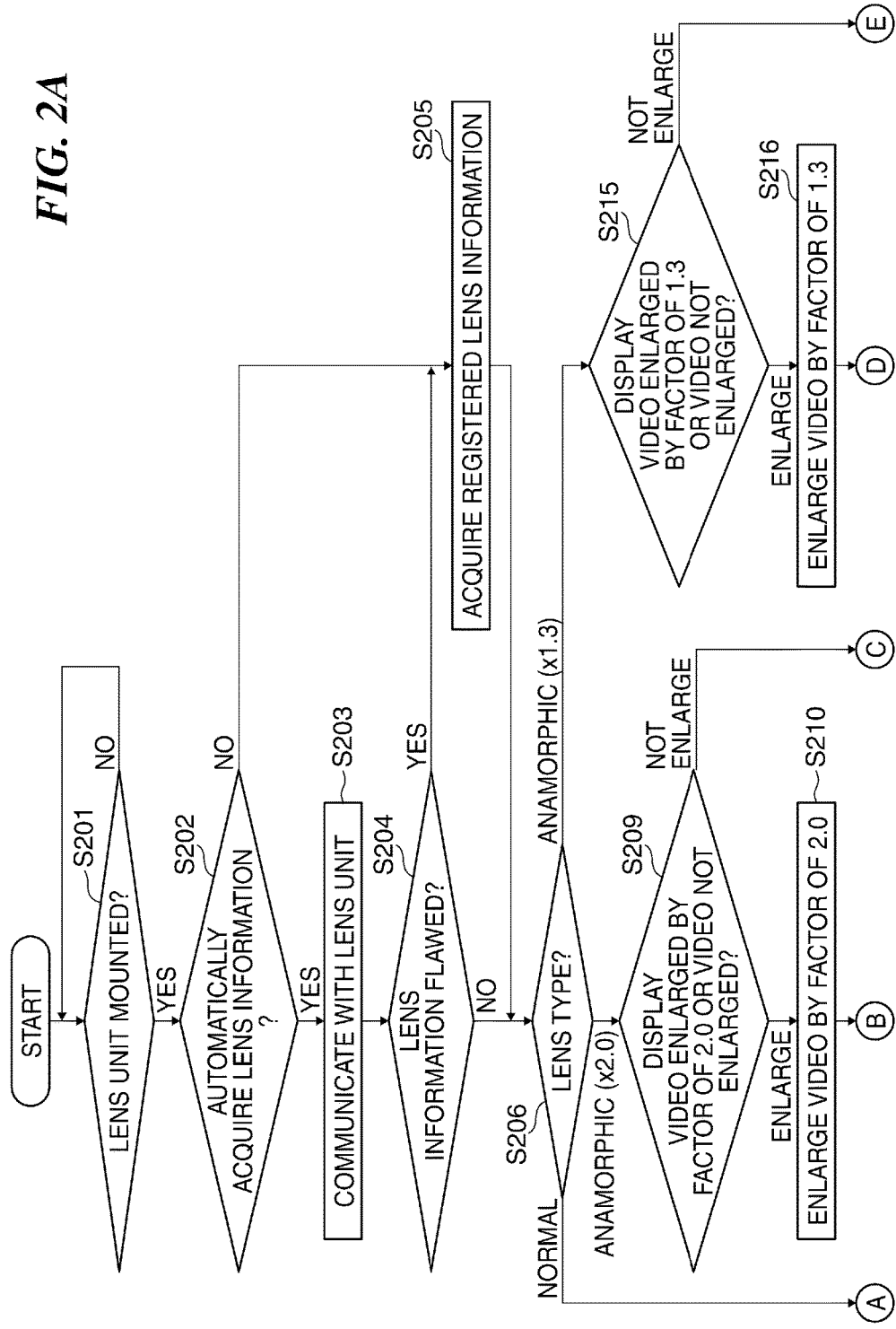
FIG. 2A is a flowchart of a video switching process for switching a video to be displayed on a display section of the video camera shown in FIG. 1.
Figure 2B:
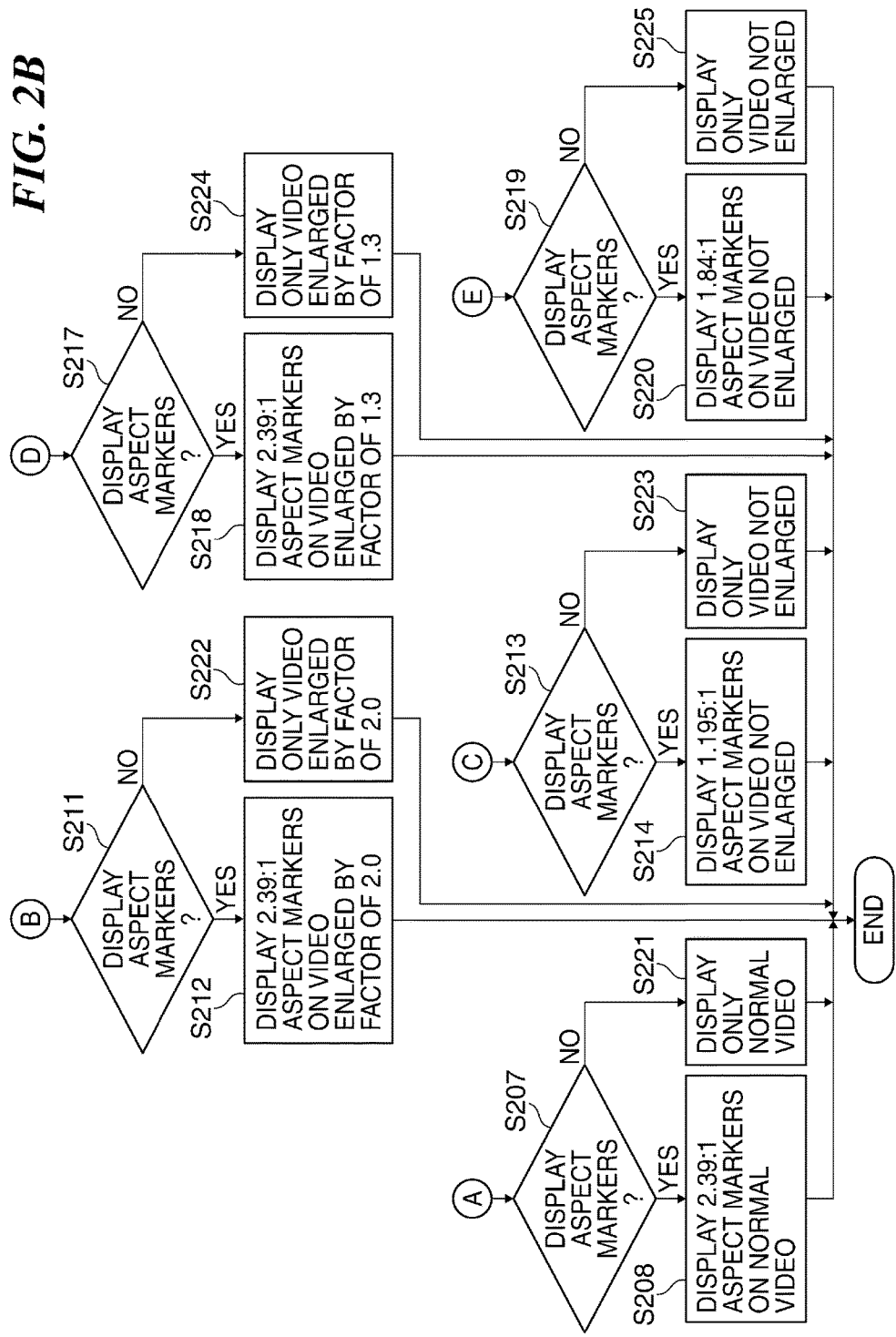
FIG. 2B is a continuation of FIG. 2A.

FIGS. 2A and 2B are a flowchart of the video switching process for switching between videos to be displayed on the display section 28 appearing in FIG. 1. The present process is realized by the system controller 50 loading the program for performing the present process, which is read out from the nonvolatile memory 56, into the system memory 52.

First, in a step S201, the system controller 50 determines whether or not the lens 103 is mounted on the lens unit 150. In this step, if it is determined that the lens 103 is mounted on the lens unit 150 (YES to the step S201), the process proceeds to a step S202.

In the step S202, it is determined according to a selection value selected by the user using the lens information acquisition-switching switch 58 whether to perform automatic acquisition of lens information or to perform manual acquisition of the same. If the automatic acquisition of the lens information is to be performed (YES to the step S202), the process proceeds to a step S203, whereas if the manual acquisition of the same is to be performed (NO to the step S202), the process proceeds to a step S205.

In the step S203, the system controller 50 communicates with the lens unit 150 via the communication terminal 10, and acquires the lens information. The type of the mounted lens indicated by the lens information acquired in this step is one of the normal lens, the ×2.0 anamorphic lens, and the ×1.3 anamorphic lens. Upon acquisition of the lens information via the communication with the lens unit 150, the system controller 50 loads the acquired lens information into the system memory 52, and the process proceeds to a step S204.

In the step S204, the system controller 50 determines whether or not the lens information acquired in the step S203 is flawed. This is because many of anamorphic lenses are old products, and the lens information acquired via the communication with the lens unit 150 in the step S203 is sometimes flawed. Examples of the above-mentioned case where the lens information is flawed include a case where no lens information could be acquired from the lens unit 150.

If it is determined in the step S204 that the acquired lens information is not flawed (NO to the step S204), the process proceeds to a step S206, whereas if it is determined that the acquired lens information is flawed (YES to the step S204), the process proceeds to the step S205.

In the step S205, the system controller 50 loads lens information registered in the nonvolatile memory 56 into the system memory 52, and the process proceeds to the step S206. Note that one of the menu setting values 902 to 904 on the menu screen in FIG. 9 is selected in advance by the user to thereby register the lens information in the nonvolatile memory 56.

In the step S206, the type of the lens is determined based on the lens information acquired in the step S203 or S205. If it is determined in the step S206 that the type of the lens is the normal lens ("NORMAL" to the step S206), the process proceeds to a step S207. If it is determined that the type of the lens is the ×2.0 anamorphic lens ("ANAMORPHIC (×2.0)" to the step S206), the process proceeds to a step S209, and if it is determined that the type of the lens is the ×1.3 anamorphic lens ("ANAMORPHIC (×1.3)" to the step S206), the process proceeds to a step S215.

In the step S207, the system controller 50 determines, based on a setting registered in the nonvolatile memory 56, whether or not aspect markers are to be displayed in a state superimposed on a video. More specifically, in a case where the menu setting value 909 has been registered in the nonvolatile memory 56, it is determined that the aspect markers are to be displayed (YES to the step s207), and the process proceeds to a step S208. Note that one of the menu setting values 909 and 910 on the menu screen in FIG. 9 is selected in advance by the user to thereby register the setting in the nonvolatile memory 56.

Figure 3:
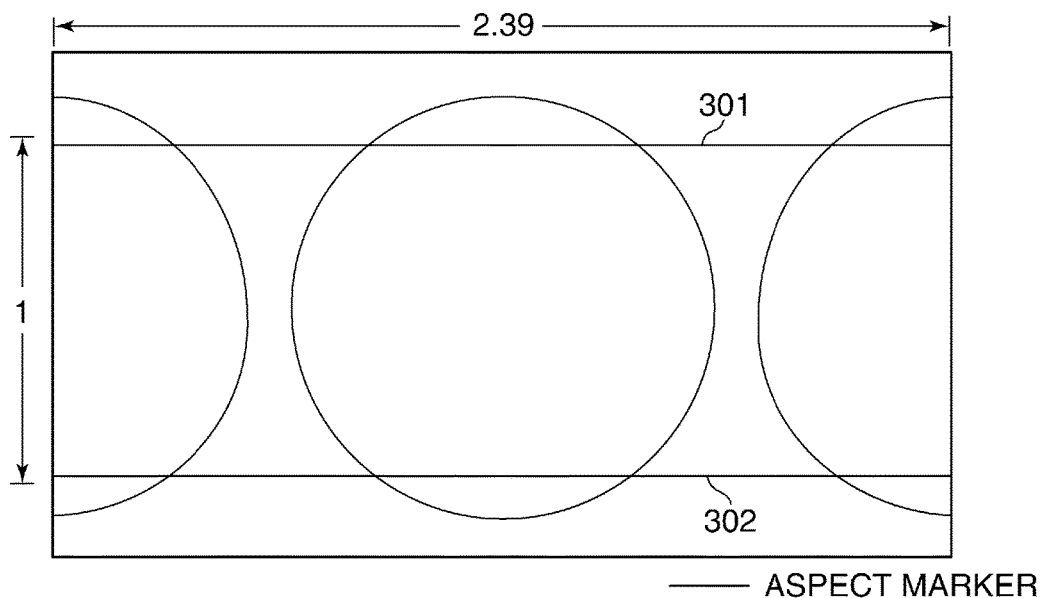
FIG. 3 is a view of a screen displayed on the display section in a step S208 in FIG. 2B, which shows a video with aspect markers superimposed thereon.

In the step S208, the system controller 50 instructs the display section 28 to display the aspect markers indicative of an aspect ratio of 2.39:1 which are stored in the nonvolatile memory 56 in a state superimposed on a video acquired via the normal lens (hereinafter referred to as the "normal video"), followed by terminating the present process. With this, as shown in FIG. 3, the display section 28 displays the normal video and the aspect markers, denoted by 301 and 302, which indicate the aspect ratio of 2.39:1 (cinemascope size as the photographing range).

Figure 4:
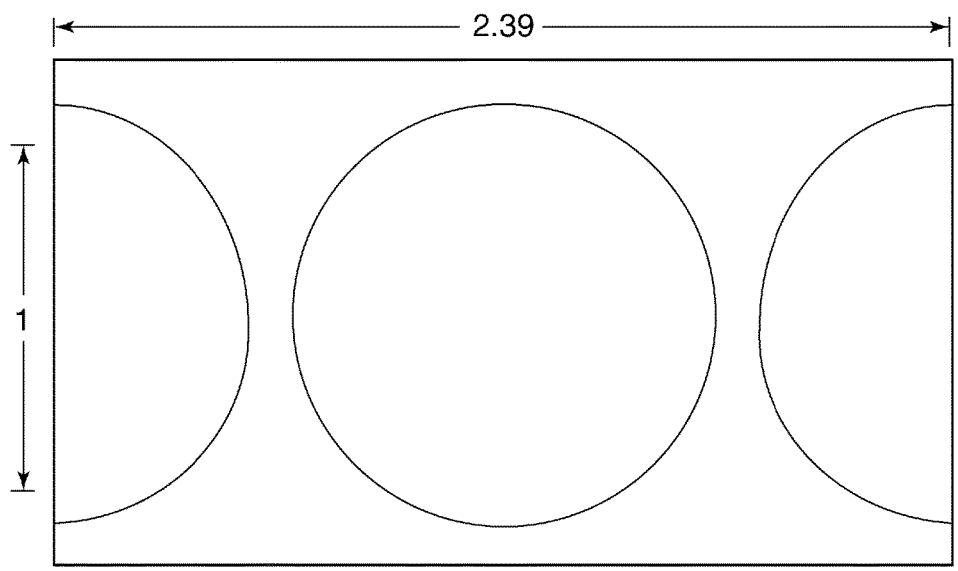
FIG. 4 is a view of a screen displayed on the display section in a step S221 in FIG. 2B, which shows only the video without showing the aspect markers.

On the other hand, in a case where the menu setting value 910 has been registered in the nonvolatile memory 56, it is determined in the step S207 that no aspect markers are to be displayed (NO to the step S207), the system controller 50 instructs the display section 28 to display only the normal video, followed by terminating the present process (step S221). With this, as shown in FIG. 4, the display section 28 displays only the normal video.

In the step S209, the system controller 50 acquires a setting of switching of the video, which has been registered in the nonvolatile memory 56. Note that one of the menu setting values 906 and 907 on the menu screen in FIG. 9 is selected in advance by the user to thereby register the setting in the nonvolatile memory 56. The system controller 50 determines, based on the acquired setting, whether to display a video reduced using the ×2.0 anamorphic lens as the mounted lens, after enlarging the video in the horizontal direction by a factor of 2.0 using the video camera, or to display the video as it is without changing the same. More specifically, in a case where the menu setting value 907 has been registered in the nonvolatile memory 56, it is determined that the video reduced using the ×2.0 anamorphic lens as the mounted lens is to be displayed after being enlarged using the video camera ("ENLARGE" to the step S209), and the process proceeds to a step S210. On the other hand, in a case where the menu setting value 906 has been registered in the nonvolatile memory 56, it is determined that the video reduced using the ×2.0 anamorphic lens as the mounted lens is to be displayed on the video camera as it is ("NOT ENLARGE" to the step S209), and the process proceeds to a step S213.

In the step S210, the system controller 50 instructs the image processor 24 to enlarge the video, and the image processor 24 performs processing for enlarging the video. After completion of the processing, the process proceeds to a step S211.

In the step S211, the system controller 50 determines, based on the setting registered in the nonvolatile memory 56, whether or not the aspect markers are to be displayed in a state superimposed on the video. More specifically, in a case where the menu setting value 909 has been registered in the nonvolatile memory 56, it is determined that the aspect markers are to be displayed (YES to the step S211), and the process proceeds to a step S212. Note that, as mentioned hereinabove, one of the menu setting values 909 and 910 on the menu screen in FIG. 9 is selected in advance by the user to thereby register the setting in the nonvolatile memory 56.

Figure 5:
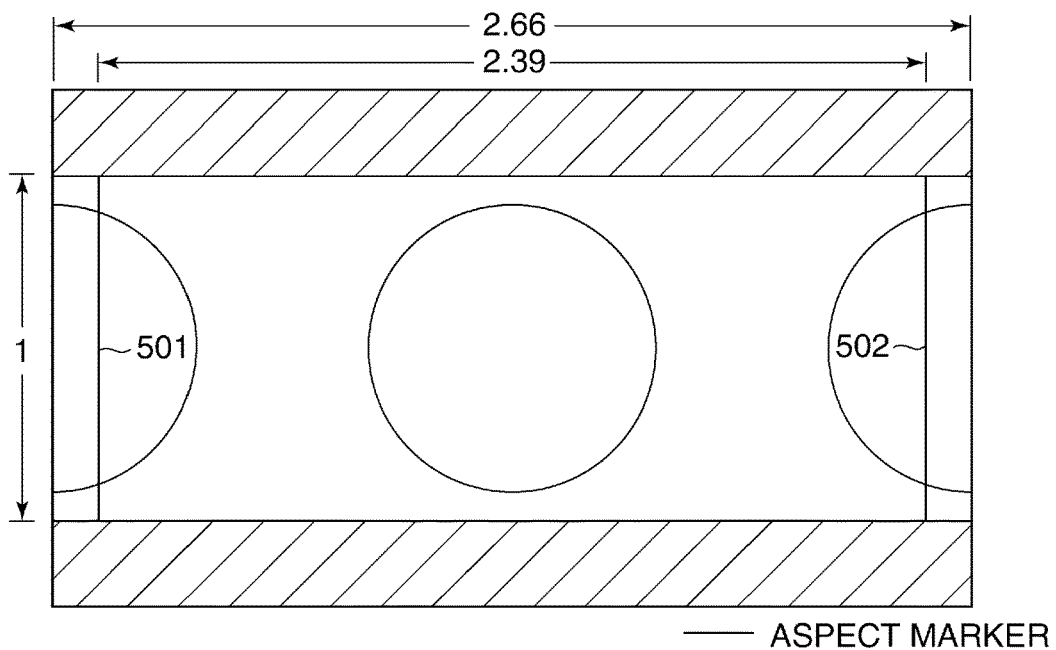
FIG. 5 is a view of a screen displayed on the display section in a step S212 in FIG. 2B, which shows a video with the aspect markers superimposed thereon.

In the step S212, the system controller 50 acquires information of the aspect markers indicative of the aspect ratio of 2.39:1 which are to be superimposed on the video enlarged in the horizontal direction by a factor of 2.0, which information is stored in the nonvolatile memory 56, and instructs the display section 28 to display the aspect markers, followed by terminating the present process. With this, as shown in FIG. 5, the display section 28 superimposes the aspect markers, denoted by 501 and 502, which indicate the aspect ratio of 2.39:1 (cinemascope size) on the video. Note that the video displayed on the display section 28 has an aspect ratio of 2.66:1, as shown in FIG. 5.

Figure 6:
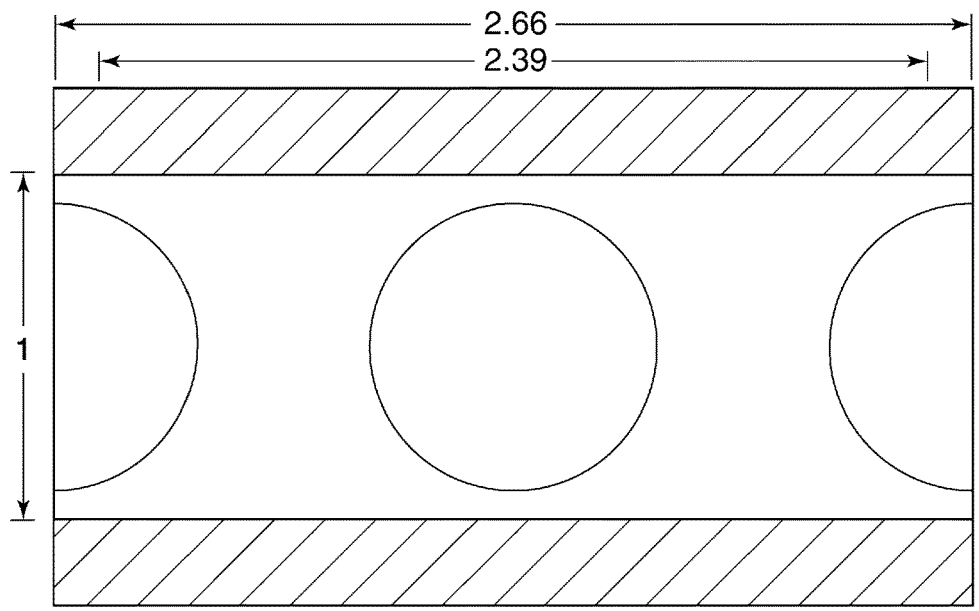
FIG. 6 is a view of a screen displayed on the display section in a step S222 in FIG. 2B, which shows only the video without showing the aspect markers.

On the other hand, in a case where the menu setting value 910 has been registered in the nonvolatile memory 56, it is determined that no aspect markers are to be displayed (NO to the step S211), and the process proceeds to a step S222. In the step S222, the system controller 50 instructs the display section 28 to display only the video enlarged in the horizontal direction by a factor of 2.0 and having the aspect ratio of 2.66:1, as shown in FIG. 6, followed by terminating the present process.

In the step S213, the system controller 50 determines, based on the setting registered in the nonvolatile memory 56, whether or not the aspect markers are to be displayed in a state superimposed on the video. More specifically, in a case where the menu setting value 909 has been registered in the nonvolatile memory 56, it is determined that the aspect markers are to be displayed (YES to the step S213), and the process proceeds to a step S214. Note that similar to the step S211, one of the menu setting values 909 and 910 on the menu screen in FIG. 9 is selected in advance by the user to thereby register the setting in the nonvolatile memory 56.

Figure 7:
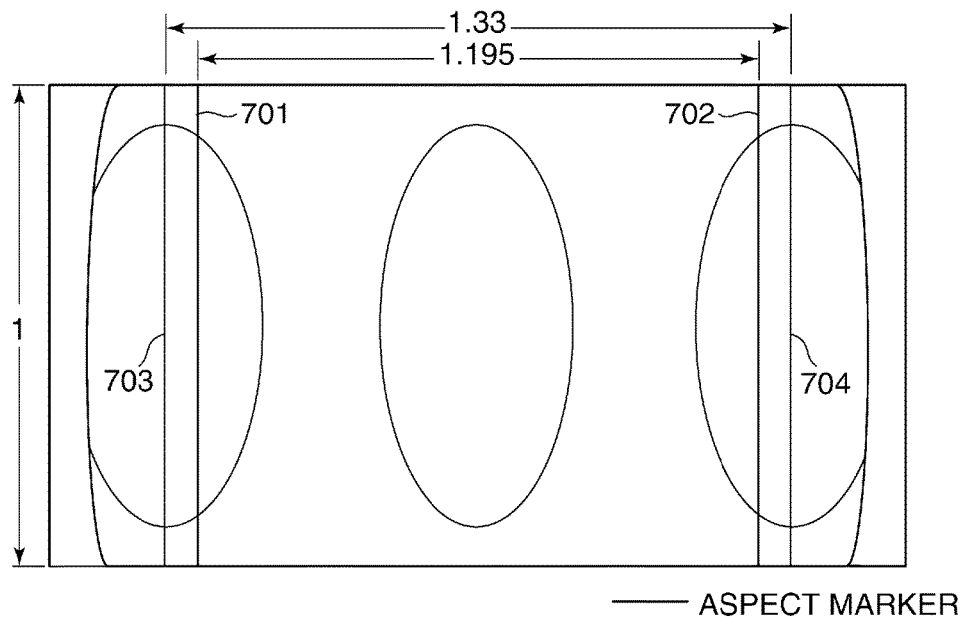
FIG. 7 is a view of a screen displayed on the display section in a step S214 in FIG. 2B, which shows a video with the aspect markers superimposed thereon.

In the step S214, the system controller 50 acquires information of the aspect markers indicative of the aspect ratio of 2.39:1 which are to be superimposed on a video remaining reduced in the horizontal direction by a factor of ½ using the mounted lens without being enlarged, which information is stored in the nonvolatile memory 56, and instructs the display section 28 to display the aspect markers, followed by terminating the present process. The screen displayed at this time on the display section 28 is shown in FIG. 7. More specifically, the aspect markers, denoted by 701 and 702, which indicate an aspect ratio of 1.195:1 obtained by reducing the cinemascope size of 2.39:1 in the horizontal direction by a factor of ½, are superimposed on the video. Note that the video displayed on the display section 28 also has aspect markers 703 and 704 superposed thereon, which indicate an aspect ratio of 1.33:1 showing a range of the video displayed on the display section 28 after being enlarged. That is, the display on the display section 28 is controlled such that, for example, in a case where a video reduced in the horizontal direction by a factor of ½ using the mounted lens is displayed before displaying a video formed by enlarging the reduced video by a factor of 2 using the video camera 100, not only aspect markers indicating an aspect ratio associated with the reduced video but also aspect markers indicating an aspect ratio associated with the enlarged video are displayed together.

Figure 8:
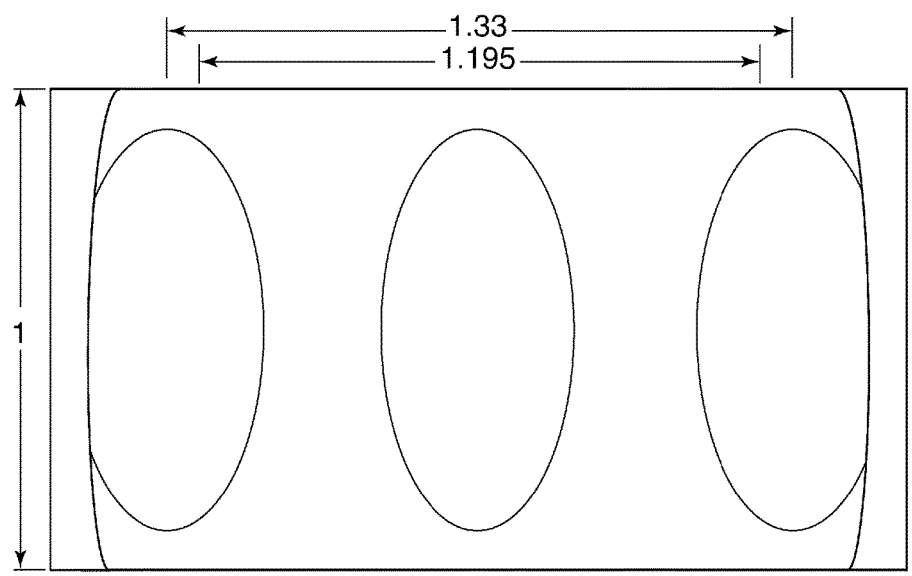
FIG. 8 is a view of a screen displayed on the display section in a step S223 in FIG. 2B, which shows only the video without showing the aspect markers.

On the other hand, in a case where the menu setting value 910 has been registered in the nonvolatile memory 56, it is determined that no aspect markers are to be displayed (NO to the step S213), and the process proceeds to a step S223. In the step S223, the system controller 50 instructs the display section 28 to display only the video reduced in the horizontal direction by a factor of ½ using the mounted lens as it is, as shown in FIG. 8, followed by terminating the present process.

In the step S215, the system controller 50 acquires a setting of switching of the video, which has been registered in the nonvolatile memory 56. Note that, similar to the step S209, one of the menu setting values 906 and 907 on the menu screen in FIG. 9 is selected in advance by the user to thereby register the setting in the nonvolatile memory 56. The system controller 50 determines, based on the acquired setting, whether to display a video reduced using the ×1.3 anamorphic lens as the mounted lens, after enlarging the video in the horizontal direction by a factor of 1.3 using the video camera, or to display the video as it is without changing the same. More specifically, in a case where the menu setting value 907 has been registered in the nonvolatile memory 56, it is determined that the video reduced using the ×1.3 anamorphic lens as the mounted lens is to be displayed after being enlarged using the video camera ("ENLARGE" to the step S215), and the process proceeds to a step S216. On the other hand, in a case where the menu setting value 906 has been registered in the nonvolatile memory 56, it is determined that the video reduced using the ×1.3 anamorphic lens as the mounted lens is to be displayed on the video camera as it is ("NOT ENLARGE" to the step S209), and the process proceeds to a step S219.

In the step S216, the system controller 50 instructs the image processor 24 to enlarge the video, and the image processor 24 performs processing for enlarging the video. After completion of the processing, the process proceeds to a step S217.

In the step S217, the system controller 50 determines, based on the setting registered in the nonvolatile memory 56, whether or not the aspect markers are to be displayed in a state superimposed on the video. More specifically, in a case where the menu setting value 909 has been registered in the nonvolatile memory 56, it is determined that the aspect markers are to be displayed (YES to the step S217), and the process proceeds to a step S218. Note that, similar to the step S211, one of the menu setting values 909 and 910 on the menu screen in FIG. 9 is selected in advance by the user to thereby register the setting in the nonvolatile memory 56.

In the step S218, the system controller 50 acquires information of the aspect markers indicative of the aspect ratio of 2.39:1 which are to be superimposed on the video enlarged in the horizontal direction by a factor of 1.3, which information is stored in the nonvolatile memory 56, and instructs the display section 28 to display the aspect markers, followed by terminating the present process.

On the other hand, in a case where the menu setting value 910 has been registered in the nonvolatile memory 56, it is determined that no aspect markers are to be displayed (NO to the step S217), and the process proceeds to a step S224. In the step S224, the system controller 50 instructs the display section 28 to display only the video enlarged in the horizontal direction by a factor of 1.3, followed by terminating the present process.

In the step S219, the system controller 50 determines, based on the setting registered in the nonvolatile memory 56, whether or not the aspect markers are to be displayed in a state superimposed on the video. More specifically, in a case where the menu setting value 909 has been registered in the nonvolatile memory 56, it is determined that the aspect markers are to be displayed (YES to the step S219), and the process proceeds to a step S220. Note that, similar to the step S211, one of the menu setting values 909 and 910 on the menu screen in FIG. 9 is selected in advance by the user to thereby register the setting in the nonvolatile memory 56.

In the step S220, the system controller 50 acquires information of aspect markers indicative of the aspect ratio of 2.39:1 which are to be superimposed on a video remaining reduced in the horizontal direction without being enlarged, which information is stored in the nonvolatile memory 56, and instructs the display section 28 to display the aspect markers, followed by terminating the present process. More specifically, the aspect markers which indicate an aspect ratio of 1.84:1 obtained by reducing the cinemascope size of 2.39:1 in the horizontal direction by a factor of 1/1.3 are superimposed on the video.

As described above, the aspect ratios indicated by the aspect markers superimposed on the video reduced in the horizontal direction are controlled according to the difference between scaling factors at which respective different types of mounted lenses reduce the video. More specifically, in a case where the type of a mounted lens is a normal lens, an aspect ratio indicated by aspect markers superimposed on the video is set to 2.39:1 as in the step S208. In a case where the type of the mounted lens is the ×2.0 anamorphic lens (lens for reducing the video in the horizontal direction by a factor of 1/2.0), an aspect ratio indicated by aspect markers superimposed on the video is set to 1.195:1 as in the step S214. On the other hand, in a case where the type of the mounted lens is the ×1.3 anamorphic lens (lens for reducing the video in the horizontal direction by a factor of 1/1.3), an aspect ratio indicated by aspect markers superimposed on the video is set to 1.84:1 as in the step S220. When the type of the mounted lens is changed from the normal lens (lens for magnifying the video in the horizontal direction by a factor of 1/1.0) to the ×2.0 anamorphic lens, the aspect ratio indicated by the aspect markers superimposed on the video is changed from 2.39:1 to 1.195:1. The aspect ratio indicated by the aspect markers after the change of the lens can be expressed using the aspect ratio indicated by the aspect markers before the change, as $\{(2.39 \times 1.0/2.0):1\}$. Further, when the type of the mounted lens is changed from the ×2.0 anamorphic lens to the ×1.3 anamorphic lens, the aspect ratio indicated by the aspect markers superimposed on the video is changed from 1.195:1 to 1.84:1. The aspect ratio indicated by the aspect markers after the change of the lens can be expressed using the aspect ratio indicated by the aspect markers before the change, as $\{(1.195 \times 2.0/1.3):1\}$.

That is, when a lens for reducing a video in the horizontal direction by a factor of 1/a is changed to a lens for reducing the video in the horizontal direction by a factor of 1/b (a≥1, b≥1, a≠b), an aspect ratio indicated by displayed aspect markers after the change is M':N (M'=M×a/b) assuming that the aspect ratio before the change is M:N.

Further, the aspect ratio indicated by the aspect markers superimposed on the video reduced using the mounted lens is determined to be m/k:n according to an aspect ratio (2.39:1=m:n) of the screen of the display section 28 and a scaling factor (k) by which the mounted lens reduces the video. On the other hand, in the case where the video is enlarged by the video camera, the aspect ratio indicated by the aspect markers superimposed on the video is determined to be m:n.

As described hereinabove, in the present embodiment, the display of the aspect markers indicating, for example, the aspect ratio of 1.195:1, which corresponds to a photographing range in the case where the video is reduced using the ×2.0 anamorphic lens, as in the illustrated example of the screen in FIG. 7, is realized by selection of the type of the mounted lens and the enlargement/reduction of the video.

This aspect ratio may be stored in advance as a setting in the video camera, similarly to aspect ratios, such as 4:3 and 16:9, which have been conventionally regarded as standards. In this case, the aspect ratio of 1.195:1 is stored in the nonvolatile memory 56 as the photographing range in the case where the video is reduced using the ×2.0 anamorphic lens. Further, the aspect ratio of 1.84:1 is stored in the nonvolatile memory 56 as a photographing range in the case where the video is reduced using the ×1.3 anamorphic lens.

On the other hand, in the step S219, in a case where the menu setting value 910 has been registered in the nonvolatile memory 56, it is determined that no aspect markers are to be displayed, and the process proceeds to a step S225. In the step S225, the system controller 50 instructs the display section 28 to display only the video, followed by terminating the present process.

Figure 14:
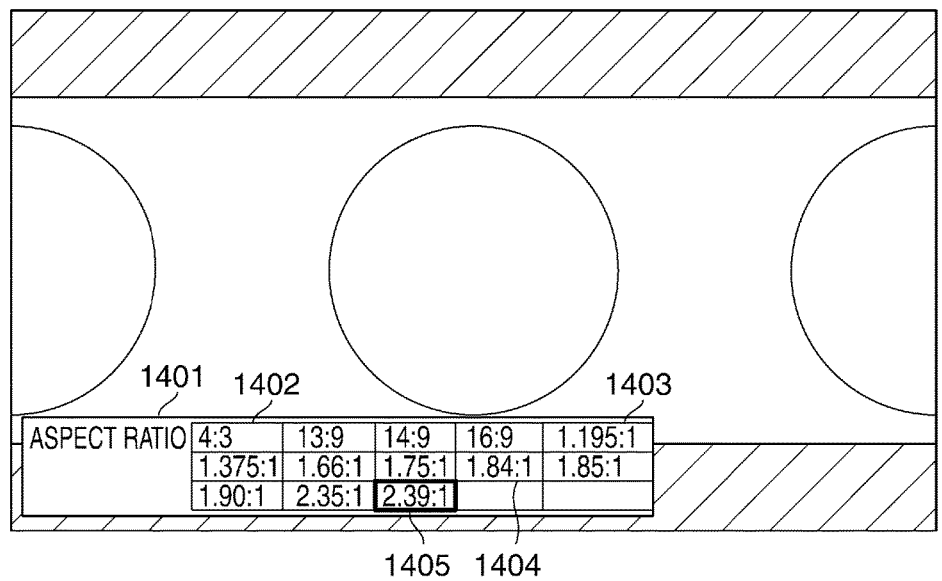
FIG. 14 is a view of an aspect ratio setting screen displayed on the display section.

FIG. 14 is a diagram showing an aspect ratio setting screen displayed on the display section 28. An aspect ratio setting 1401 is displayed on the screen by pressing the above-mentioned menu button.

The aspect ratio setting 1401 includes a list of a plurality of aspect ratio setting values 1402 which can be set.

The aspect ratio setting values 1402 include a setting value 1403 indicating the aspect ratio "1.195:1" as the photographing range in the case where video is reduced in the horizontal direction using the ×2.0 anamorphic lens. The aspect ratio setting values 1402 also include a setting value 1404 indicating the aspect ratio "1.84:1" as the photographing range in the case where video is reduced in the horizontal direction using the ×1.3 anamorphic lens.

A cursor 1405 is a thick frame indicating selection of one of the above-mentioned aspect ratio setting values 1402, which is performed according to a user's operation of the above-mentioned four-direction button. After moving the cursor 1405 using the four-direction button to select a setting value, when the user presses the set button, the system controller 50 updates information of the aspect ratio setting value registered in the nonvolatile memory 56.

Next, a description will be given of a variation of the present embodiment. Although the above-described embodiment is configured such that the aspect markers clearly indicating the photographing range are changed according to the enlargement/reduction of a video, the present variation is configured such that the display of safety zone markers clearly indicating a range (safety zone) within which an important video part, such as character information or the like, is to be arranged, and/or the display of a gird formed by grid lines for equally dividing a screen into nine blocks so as to determine a composition of the video, are changed according to the enlargement/reduction of the video.

Figure 10:
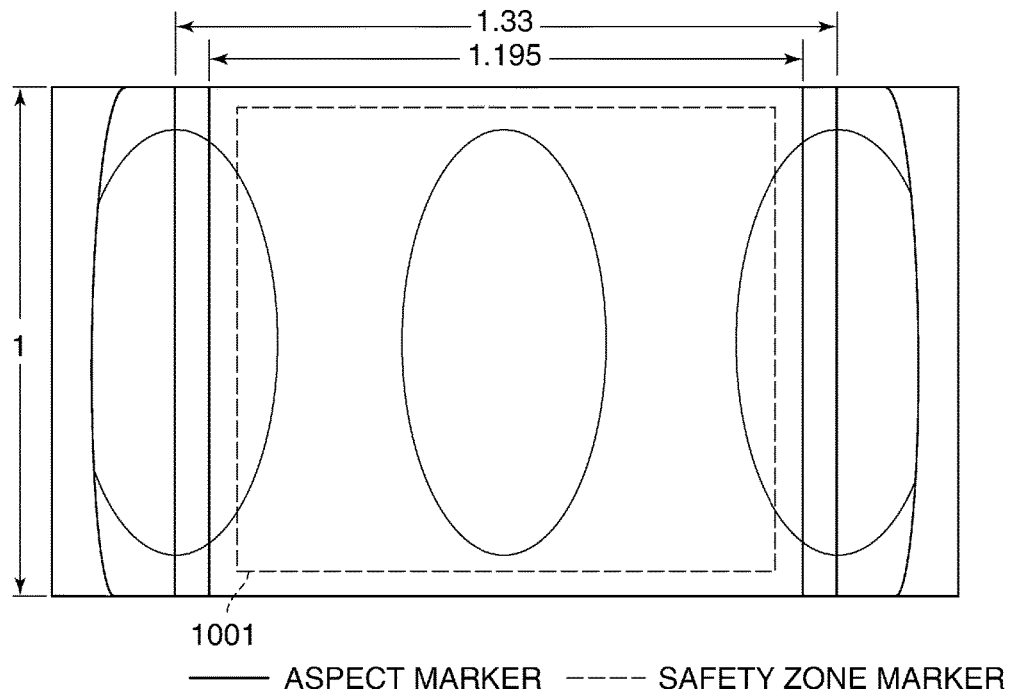
FIG. 10 is a view of a screen showing a video reduced in a horizontal direction using a mounted lens, with aspect markers and safety zone markers superimposed thereon.

FIG. 10 shows a screen displayed according to the present variation, on which aspect markers and safety zone markers indicating a safety zone are superimposed on a video reduced in the horizontal direction using the mounted lens. More specifically, in FIG. 10, the safety zone markers, denoted by 1001, which indicate the safety zone having the aspect ratio of 1.195:1, are additionally superimposed on the screen shown in FIG. 7. Note that the safety zone appearing in FIG. 10 are defined by upper and lower safety zone markers and left and right safety zone markers, and the reference numeral 1001 collectively denotes these safety zone markers.

Note that when no aspect markers are required, the safety zone markers 1001 may be superimposed on a screen, such as the screen shown in FIG. 8, on which only a video is displayed. Further, when the safety zone markers are superimposed on a video obtained by enlarging the video reduced by the mounted lens, safety zone markers indicating a safety zone having the aspect ratio of 2.39:1 are superimposed.

Figure 11:
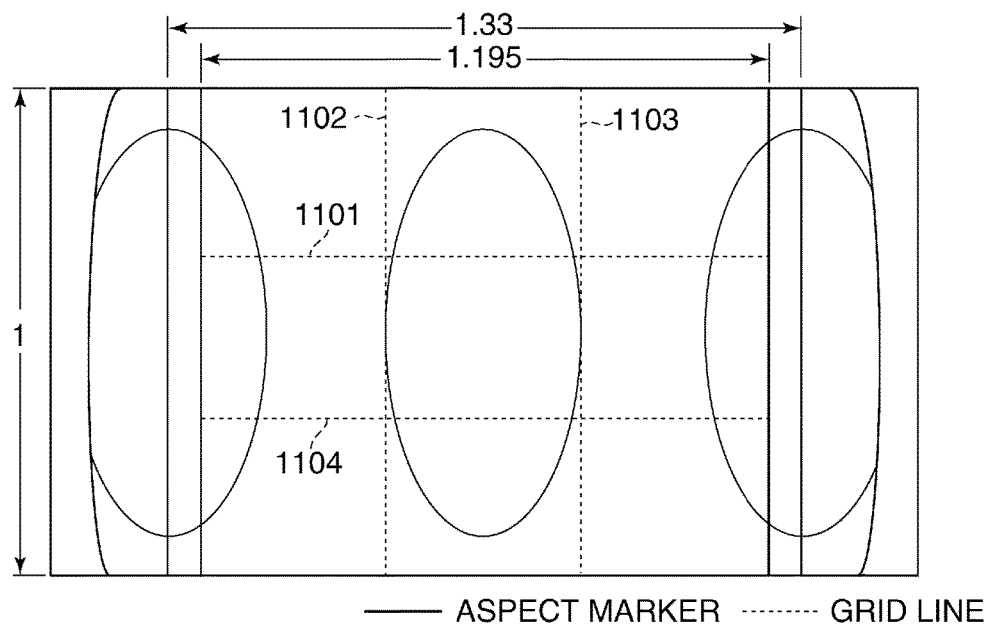
FIG. 11 is a view of a screen showing a video reduced in the horizontal direction using the mounted lens, with the aspect markers and grid lines superimposed thereon.

Further, FIG. 11 shows a screen displayed in the present variation, on which the aspect markers and the grid are superimposed on a video reduced in the horizontal direction using the mounted lens. More specifically, in FIG. 11, grid lines 1101, 1102, 1103, and 1104 for division into areas each having the aspect ratio of 1.195:1 is further superimposed on the screen in the FIG. 7.

Note that similar to FIG. 10, when no aspect markers are required, the grid lines 1101, 1102, 1103, and 1104 may be superimposed on a screen, such as the screen shown in FIG. 8, on which only a video is displayed. Further, when grid lines are superimposed on a video obtained by enlarging the video reduced using the mounted lens, grid lines for division into areas each having the aspect ratio of 2.39:1 are superimposed.

Note that in FIGS. 7, 10, and 11, out of the markers of aspect markers, safety zone markers, and grid lines, only markers indicating an aspect ratio of m/k:n for a video remaining reduced using a mounted lens in the horizontal direction by a factor of 1/k are displayed on the display section 28. However, not only such markers, but also markers indicating an aspect ratio of m:n for a video formed by being enlarged in the horizontal direction (hereinafter referred to as the "actual video") may be simultaneously displayed. In this case, markers of the same type are displayed using the same color or the same type of lines, so as to make the user aware that the markers simultaneously indicating respective different aspect ratios correspond to each other.

Figure 12:
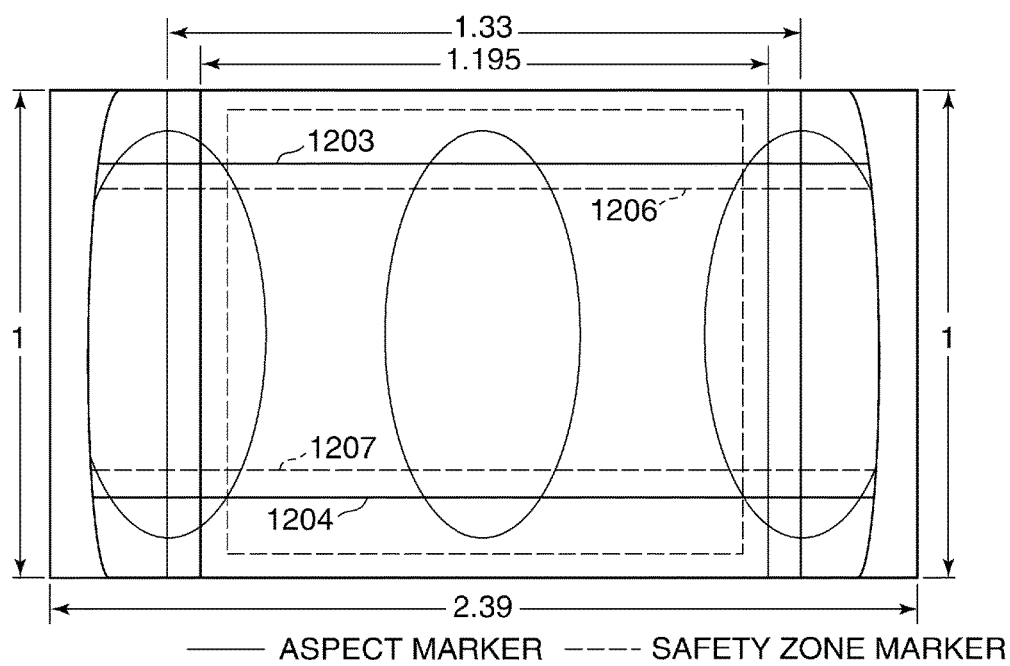
FIG. 12 is a view of a screen showing the video in a state in which aspect markers and safety zone markers for an actual video are additionally superimposed on the screen in FIG. 10.

FIG. 12 shows a screen displayed according to the present variation, on which the aspect markers and the safety zone markers for the actual video are additionally superimposed on the screen shown in FIG. 10. More specifically, aspect markers 1203 and 1204 and safety zone markers 1206 and 1207 for a video obtained by enlarging the video by a factor of 2 in the horizontal direction are superimposed on the screen shown in FIG. 10. The safety zone markers 1206 and 1207 define a safety zone therebetween.

Figure 13:
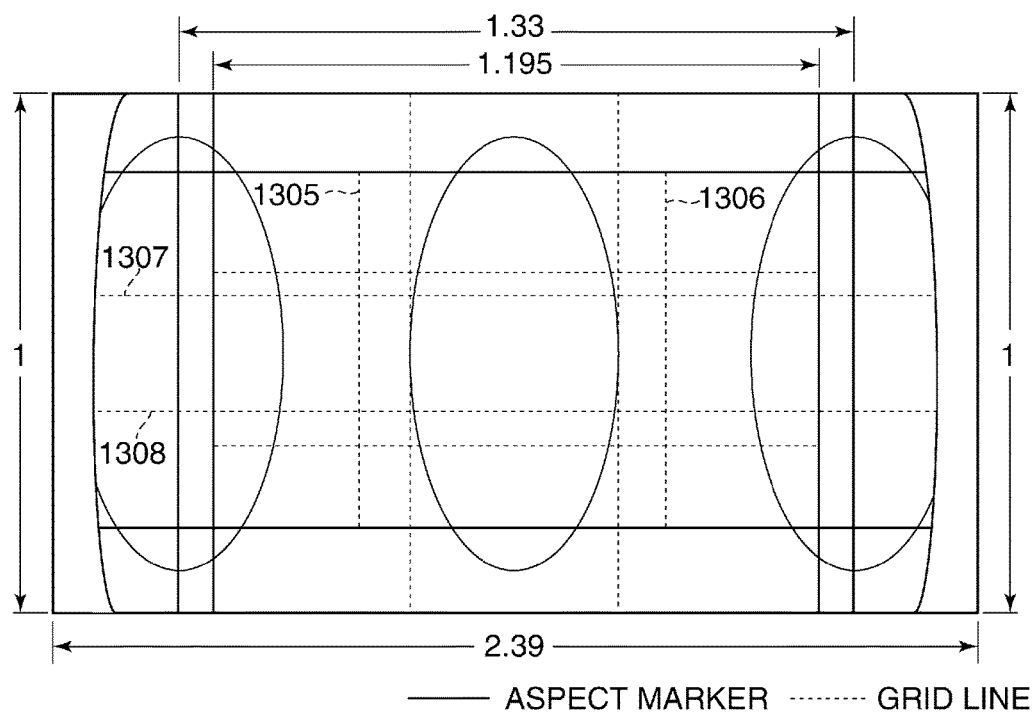
FIG. 13 is a view of a screen showing the video in a state in which aspect markers and grid lines for an actual video are additionally superimposed on the screen in FIG. 11.

Further, FIG. 13 shows a screen displayed according to the present variation, on which the aspect markers and the grid lines for the actual video are additionally superimposed on the screen shown in FIG. 11. More specifically, grid lines 1305, 1306, 1307, and 1308 for the video obtained by enlarging the video in the horizontal direction by a factor of 2 are superimposed on the screen shown in FIG. 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. The above-described embodiment may be partially combined on an as-needed basis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-215403 filed Nov. 2, 2016 which is hereby incorporated by reference herein in its entirety.

What is claimed is:

1. An image pickup apparatus comprising:
a lens mounting section;
a determination unit configured to determine a type of a lens mounted on the lens mounting section; and
a display control unit configured to perform control such that in a case where it is determined by the determination unit that the type of the lens mounted on the lens mounting section is a first lens for scaling a video by a factor of 1/a (a≥1) in a horizontal direction with respect to a vertical direction, first aspect markers indicating an aspect ratio of M:N are displayed in a state superimposed on a first video acquired via the first lens, whereas in a case where it is determined by the determination unit that the type of the lens mounted on the lens mounting section is a second lens for scaling the video by a factor of 1/b (b≥1, a≠b) in the horizontal direction with respect to the vertical direction, second aspect markers indicating an aspect ratio of M':N (M'=M×a/b) are displayed in a state superimposed on a second video acquired via the second lens.

2. The image pickup apparatus according to claim 1, further comprising a transformation unit configured to generate a first transformed video by enlarging the first video in the horizontal direction by a factor of a, or to generate a second transformed video by enlarging the second video in the horizontal direction by a factor of b, and
wherein in a case where the first transformed video is displayed, the display control unit performs control such that aspect markers indicating an aspect ratio of m:n are displayed, whereas in a case where the second transformed video is displayed, the display control unit performs control such that the aspect markers indicating the aspect ratio of m:n are displayed.

3. The image pickup apparatus according to claim 1, wherein the determination unit determines the type of the lens mounted on the lens mounting section based on lens information input by a user.

4. The image pickup apparatus according to claim 1, further comprising an acquisition unit configured to acquire lens information from the lens mounted on the lens mounting section, and
wherein the determination unit determines the type of the lens mounted on the lens mounting section based on the acquired lens information.

5. An image pickup apparatus comprising:
a lens mounting section that is capable of having mounted thereon a first lens for scaling a video by a factor of 1/a (a>1) in a horizontal direction with respect to a vertical direction;
a transformation unit configured to generate a first transformed video by enlarging a first video acquired via the first lens by a factor of a in the horizontal direction;
a display unit configured to display a video; and
a display control unit configured to perform control such that in a case where the first transformed video generated by the transformation unit is displayed, first aspect markers indicating an aspect ratio of m:n are displayed in a state superimposed on the first transformed video, whereas in a case where the first video is displayed, second aspect markers indicating an aspect ratio of m/a:n are displayed in a state superimposed on the first video.

6. The image pickup apparatus according to claim 5, wherein the lens mounting section is capable of having mounted thereon a second lens for scaling a video by a factor of 1/b in the horizontal direction with respect to the vertical direction (b>1, a≠b),
wherein the transformation unit generates a second transformed video by enlarging a second video acquired via the second lens by a factor of b in the horizontal direction, and
wherein in a case where the second transformed video generated by the transformation unit is displayed, the display control unit performs control such that the first aspect markers indicating the aspect ratio of m:n are displayed in a state superimposed on the second transformed video.

7. The image pickup apparatus according to claim 5, wherein in the case where the first video is displayed before generation of the first transformed video, the display control unit performs control such that the first aspect markers and the second aspect markers are displayed in a state superimposed on the first video.

8. The image pickup apparatus according to claim 7, wherein in a case where the first and second aspect markers are simultaneously displayed, the display control unit makes at least one of a color and a type of lines identical between the first and second markers.

9. The image pickup apparatus according to claim 5, wherein the display control unit performs control such that in the case where the first transformed video is displayed, safety zone markers indicating a first safety zone having the aspect ratio of m:n is displayed together with the first aspect markers, whereas in the case where the first video is displayed, safety zone markers indicating a second safety zone having the aspect ratio of m/a:n is displayed together with the second aspect markers.

10. The image pickup apparatus according to claim 9, wherein in the case where the first transformed video is displayed, the display control unit controls the display unit such that the safety zone markers indicating the second safety zone are additionally simultaneously superimposed on the first transformed video.

11. The image pickup apparatus according to claim 10, wherein in a case where the safety zone markers indicating the first safety zone and the safety zone markers indicating the second safety zone are simultaneously displayed, the display control unit makes at least one of a color and a type of lines identical between the safety zone markers indicating the first safety zone and the safety zone markers indicating the second safety zone.

12. The image pickup apparatus according to claim 5, wherein the display control unit performs control such that in the case where the first transformed video is displayed, a first grid indicating the aspect ratio of m:n is displayed, whereas in the case where the first video is displayed, a second grid indicating the aspect ratio of m/a:n is displayed.

13. The image pickup apparatus according to claim 12, wherein in a case where the first and second grids are simultaneously displayed, the display control unit makes at least one of a color and a type of lines identical between the first and second grids.

14. A non-transitory computer-readable storage medium storing a computer-executable program for executing a display control method for displaying a video acquired by an image pickup apparatus including a lens mounting section via a lens mounted on the lens mounting section,
wherein the display control method comprises:

determining a type of the lens mounted on the lens mounting section; and performing control such that in a case where it is determined that the type of the lens mounted on the lens mounting section is a first lens for scaling a video by a factor of $1/a$ ($a \geq 1$) in a horizontal direction with respect to a vertical direction, first aspect markers indicating an aspect ratio of M:N are displayed in a state superimposed on a first video acquired via the first lens, whereas in a case where it is determined that the type of the lens mounted on the lens mounting section is a second lens for scaling the video by a factor of $1/b$ ($b \geq 1$, $a \neq b$) in the horizontal direction with respect to the vertical direction, second aspect markers indicating an aspect ratio of M':N ($M' = M \times a/b$) are displayed in a state superimposed on a second video acquired via the second lens.

15. A non-transitory computer-readable storage medium storing a computer-executable program for executing a display control method for displaying a video acquired by an image pickup apparatus on which a first lens for scaling a video by a factor of $1/a$ ($a>1$) in a horizontal direction with respect to a vertical direction is mounted, wherein the display control method comprises:

generating a first transformed video by enlarging a first video acquired by the image pickup apparatus via the first lens by a factor of a in the horizontal direction; and performing control such that in a case where the first transformed video is displayed, first aspect markers indicating an aspect ratio of m:n are displayed in a state superimposed on the first transformed video, whereas in a case where the first video is displayed, second aspect markers indicating an aspect ratio of m/k:n are displayed in a state superimposed on the first video.

\* \* \* \* \*